Dec. 16, 1930.　　　T. H. SYMINGTON　　　1,785,056
RAILWAY CAR TRUCK BOLSTER
Filed April 5, 1927　　2 Sheets-Sheet 1
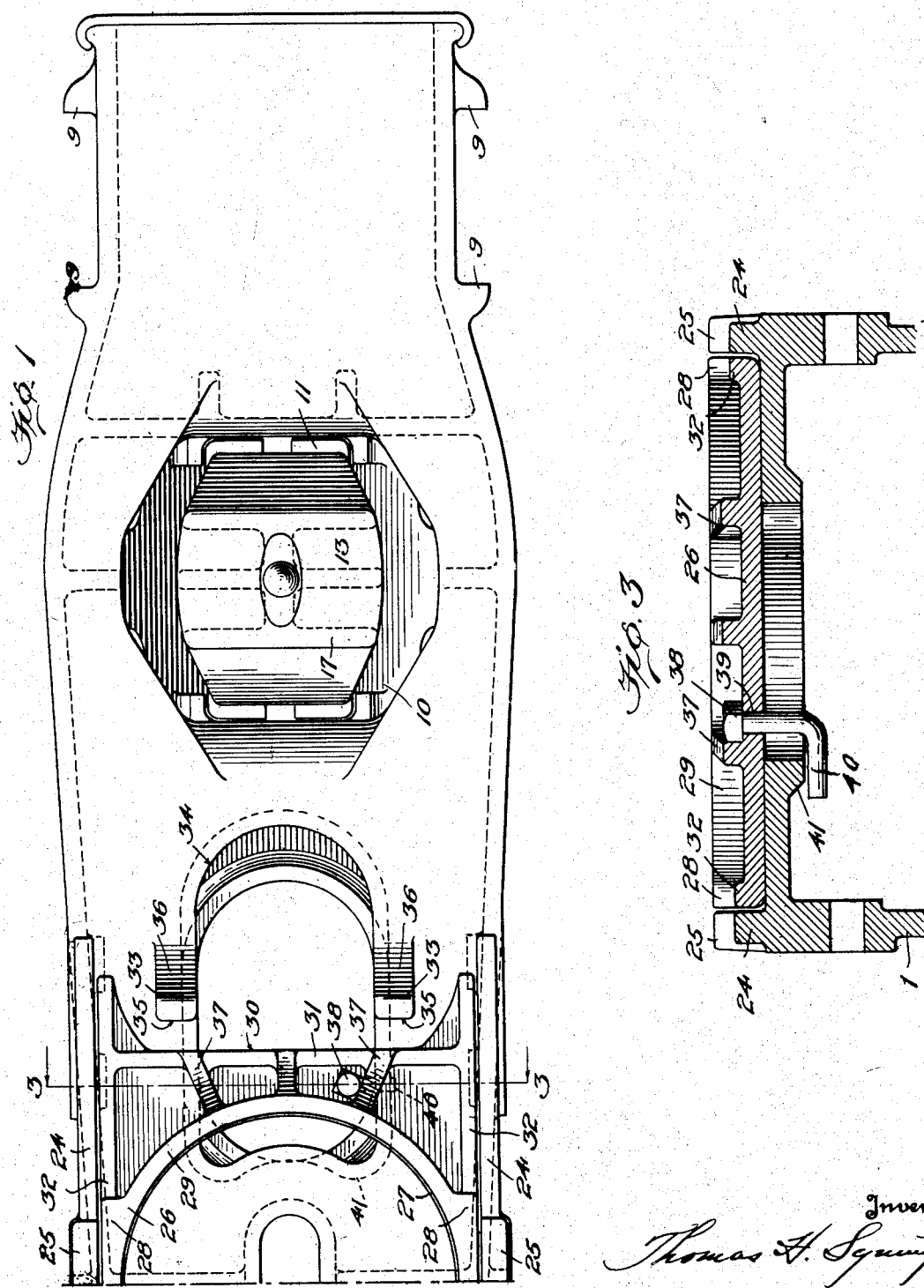

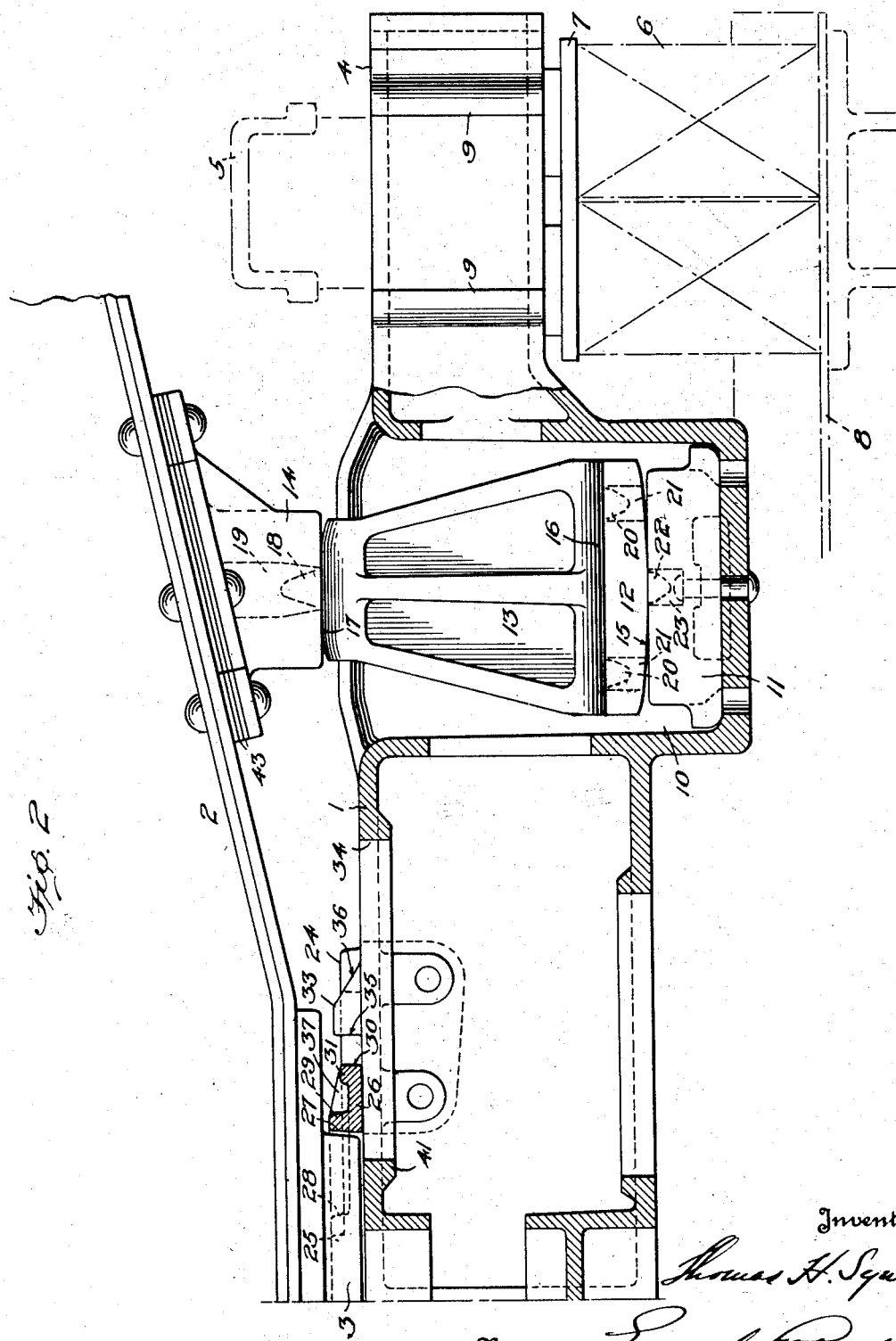

Patented Dec. 16, 1930

1,785,056

UNITED STATES PATENT OFFICE

THOMAS H. SYMINGTON, OF BALTIMORE, MARYLAND, ASSIGNOR TO T. H. SYMINGTON & SON, INC., OF BALTIMORE, MARYLAND, A CORPORATION OF MARYLAND

RAILWAY-CAR-TRUCK BOLSTER

Application filed April 5, 1927. Serial No. 181,161.

The invention relates to railway car truck bolsters, particularly that type cooperating with a body bolster for the purpose of permitting lateral motion of the latter with respect to the truck side frames.

The principal object of the invention, generally stated, is to provide a novel guide means for the depending center plate of the body bolster for the purpose of properly guiding and limiting the movement of the center plate upon the occurrence of lateral motion of the body bolster.

It is well known that in lateral motion devices, it is generally customary to provide the truck bolster with an elongated elliptical guide or elongated guide with semicircular ends, this guide receiving the depending center plate of the body bolster and permitting swivelling movement of the bolsters with respect to each other and at the same time permitting the body bolster to move longitudinally of the truck bolster, this movement being ordinarily called lateral motion. The great disadvantage with existing types of structures of this character is that when the body bolster moves laterally with respect to the truck side frames and reaches the limit of its movement the center plate strikes against the guide flange at a point, or rather a single line, the shock of the impact being concentrated and causing rapid wear which will soon result in excessive play or too great a degree of lateral motion of the truck bolster. In some instances it is even conceivable that the guide flange may be chipped, cracked or broken, rendering it ineffective and possibly necessitating replacement of the entire truck bolster or the mounting of an auxiliary part thereon if such an expedient is possible of adoption.

It is with the above facts in view that I have designed the present invention which has for an important object the provision of guide means which is in contact and embracing engagement with the center plate at all times and which is capable of restricted slidable movement upon the truck bolster so as to permit lateral motion of the body bolster, the arrangement and construction being, however, such that no excessive strain or wear will come upon any localized areas, the areas of frictional contact being large so that the wear will be distributed.

A more specific object of the invention is the provision of a truck bolster equipped centrally with a guide device slidably mounted thereon between flanges located at the sides of the truck bolster and having its movement limited by a plurality of stops so located as to distribute the shock of the impact at the limits of movement and to prevent the bringing of an excessive strain upon any particular point or small area.

A further object of the invention is to provide a structure of this character in which the guide member is always in embracing engagement with the center plate which depends from the body bolster, any appreciable impact against this center plate at a given area or line being avoided, the wear on the center plate being consequently reduced to that resulting from friction during relative swivelling movement of the bolsters at which time the center plate must of course rotate within the confines of the guide.

A still further object of the invention is the provision of a center plate guide having certain detailed construction insofar as reinforcing webs or ribs at the points of greatest strain are concerned, the structure moreover embodying such characteristics as to insure free and easy movement of the member engaging about the center plate without any danger of canting or twisting laterally.

Yet another object of the invention is to provide means for holding the center plate engaging member, or relatively movable member, in assembled relation upon the truck bolster during shipment or other handling so that dislocation and possible loss will be avoided.

An additional object of the invention is the provision of a structure of this character which will be comparatively simple and inexpensive to manufacture, which may be installed as a replacement for an ordinary type of truck bolster without involving any changes in the other parts of the truck and which will moreover be efficient and durable in service and a general improvement in the art.

To the attainment of the foregoing and other objects and advantages such as will hereinafter become apparent, the invention preferably consists in the details of construction as well as the arrangement and combination of parts to be hereinafter more fully described and claimed, and illustrated in the accompanying drawings in which:

Figure 1 is a plan view of one half of a truck bolster embodying the invention,

Figure 2 is a central vertical longitudinal section therethrough with the side bearing rocker structure shown in elevation, and Figure 3 is a detail cross sectional view taken on the line 3—3 of Figure 1 and looking in the direction of the arrows.

Referring more particularly to the drawings, the numeral 1 designates the truck bolster as a whole, and 2 represents the body bolster equipped at its underside with the usual or any preferred form of center plate 3. The truck bolster 1, while embodying the invention to be described, is intended to be of such general form and construction as to be capable of replacing one of ordinary design without involving any changes in the construction of the other parts of the truck. Pursuant to this idea, the truck bolster 1 is provided at each end with a reduced extension 4 adapted to fit within the window opening in the truck side frame 5 and to cooperate with the usual truck springs indicated diagrammatically at 6, it being usual or at least preferred to provide a spring seat or follower 7. The spring plank 8, springs 6 and side frame 5 are all shown by dot and dash lines inasmuch as they form no part of the present invention. The extension 4 is represented as having the usual vertical guides 9 cooperating with the column guides of the side frame for permitting vertical movement of the truck bolster while preventing longitudinal movement thereof.

In view of the fact that the entire assembly and combination is intended to embody means permitting lateral motion of the body bolster 2, the truck bolster 1 is suitably constructed to form a pocket 10 within the bottom of which is preferably located a bearing member or support 11 upon which is engaged a rocker assembly which includes a bearing member 12 upon which is superposed a rocker 13 cooperating with a depending bearing element 14 on the body bolster for sustaining the load, the intention being that no portion of the load will come upon the center of the truck bolster. The construction of the side bearing assembly comprised by the parts 12 and 13 is intended to be such that the upper end of the rocker member 13 will be capable of universal movement so as to permit the necessary swivelling movement of the bolsters which will occur when rounding curves, and also to permit lateral motion of the body bolster. While it is conceivable that this feature or principle may be carried out in different ways, I have here represented the bearing member 12 as having a cylindrical lower surface 15 so as to be capable of rocking movement longitudinally of the truck bolster and have shown the rocker member 13 as having a cylindrical bottom surface 16 so as to be capable of rocking movement transversely of the truck bolster, the top surface 17 of this rocker being preferably substantially spherical and formed with a spud or projection 18 of tapered shape received within a socket 19 in the bearing element 14. The spud cooperates with the socket 19 for confining the rocker to the bearing element 14 so that relative displacement will be prevented and the parts maintained always in the proper operative relation regardless of the shifting movement which necessarily occurs. For the same reason the bottom of the rocker 13 is shown as provided with teeth 20 received within holes or recesses 21 in the bearing member 12. The bearing member 12 may in turn be equipped with one or more teeth 22 received within a socket or sockets 23 in the supporting member 11. There are other mechanical details illustrated but inasmuch as they are not essential to the present invention they are not described.

The center plate 3 constitutes the pivotal connection for the bolsters during the swivelling movement thereof which occurs during travel along curved track and over switches. It becomes necessary to provide some means on the truck bolster cooperating with this center plate for confining it to the pivotal movement and to movement longitudinally of the truck bolster during lateral motion of the body bolster. This feature constitutes the essential part of the present application though it is of course necessarily employed in connection with some type of rocker or other equivalent mechanism mounted in the truck bolster and forming part of the side bearing assembly.

In carrying out this feature, the truck bolster is provided, preferably at or near its sides, with longitudinally extending parallel upstanding flanges 24 formed preferably integrally upon the top of the bolster and extending to any desired length beyond the opposite sides of the transverse center line. While these guide flanges 24 may be of uniform height throughout they are here represented as having their central portions 25 of greater height than the remainder which ordinarily would be of comparatively little height in order to avoid contact with the rivets, not shown, usually provided for securing the center plate upon the body bolster. However, this is a mere matter of detail or degree and does not in any way affect the invention.

Located between the guide flanges 24 is a guide member 26 which may conveniently be formed as a casting and which is of ring-like form or provided with a circular opening 27 conformingly receiving the depending center plate 3, it being preferable that very little play be permitted between the outer periphery of the center plate and the wall of the opening 27 to avoid the bringing of any material impact or shock at any line of tangency at any time. The member 26 is preferably somewhat thickened at the opposite sides of its center, as shown at 28, for reinforcing purposes and may also be formed with a slight upstanding rib 29 surrounding the opening 27, for the same purpose. The entire member 26 is preferably of rectangular contour to provide square or straight-across ends 30 which constitute abutments for cooperation with stop means to be described. These ends are suitably strengthened by forming them with slightly upstanding ribs 31 and the opposite side edges may be also similarly formed with ribs 32 which merge into the thickened portions 28, it being good practice to have the ribs 32 of the same height or substantially the same height as the flanges 24 for the purpose of providing as large bearing surfaces as possible.

Clearly the member 26 is slidable bodily upon the top of the truck bolster between the limits defined by stops 33 which may be conveniently cast integrally upon the top of the bolster though they may be applied thereto in some other manner if desired. The exact location of these stops is not of vital importance though they are here represented as located at the opposite sides of the usual opening 34 provided in bolsters of this general type. The abutment faces 35 of the stops 33 are preferably vertical and perpendicular to the top surface of the bolster while it is advisable that the rear surfaces 36 slope or incline downwardly so as to merge into the material of the bolster, this detail preventing crystallizing in the casting and eliminating weakness which would result from such a condition. Inasmuch as considerable force develops when the body bolster moves laterally, this force resulting in quite an appreciable impact between the end of the member 26 and the stops 33, I may find it advisable, if not absolutely necessary, to provide reinforcing webs or ribs 37 which extend from and which merge into the ribs 31 and 29 so that the strains at the areas of contact of the ends of the member 26 with the stops 33 will be distributed instead of being permitted to remain entirely localized.

In order to hold the member 26 in assembled relation to the bolster so that it will not become displaced and possibly lost during shipment or other handling prior to installation in a truck, I have found it convenient to provide retaining means which may consist simply of a bolt or pin 38 inserted through a hole 39 in the member 26 between the ribs 29 and 31, this bolt extending through the opening 34 and having its lower end upset or bent laterally as at 40 to extend beneath the thickened portion or rib 41 which surrounds the opening 34 at the underside of the top of the bolster.

Assuming that the truck bolster has been constructed as described and shown so as to embody the guide means for the center plate of the body bolster, and assuming that the body bolster is installed or mounted properly with respect to the truck bolster, there will be a slight clearance between the bottom surface of the center plate 3 and the top surface of the bolster 1. Any suitable or necessary number of shims 43 may be interposed between the bottom of the body bolster and the side bearing element 14 to insure this clearance as it is of importance that no load come upon the truck bolster at its center. The side bearing elements 14 of course rest upon the side bearing assemblies which support all the load. When the car or truck passes over curved track the body bolster and truck bolster will of course move relatively, the movement being a swivelling action, the center plate 3 rotating within the opening 27 in the member 26. When rounding curves there will of course be a tendency for the body bolster to move laterally with respect to the side frames of the truck and when this occurs the member 26 embracingly engaged upon the center plate 3 will slide longitudinally upon the top of the truck bolster, the movement being guided by the flanges 24. The movement is of course limited by the engagement of one end or the other of the member 26 with the stops 33. The side bearing assembly above described will permit both movements of the body bolster without binding or interference in any way. In view of the fact that the member 26 closely engages the center plate there will be no appreciable relative movement therebetween other than rotary movement which occurs during swivelling, all shocks and strains coming at the areas of engagement of the ends of the member 26 with the stops 33. As I provide a plurality of such stops it is clear that the shock of the impact will be distributed and owing to the particular and peculiar construction the strains will be transmitted uniformly throughout so that undue wear at these areas will not occur. As the ribs 32 and flanges 24 are of considerable length it is clear that there are not only relatively large bearing surfaces to take up the wear caused by friction but there will be no opportunity for the member 26 to cant and bind between the guide flanges. In fact every possible contingency has been foreseen and provided for in the effort to build up a thoroughly operative and efficient structure for the purpose specified. It is really believed that the construction, operation and advantages will be readily apparent to one skilled in the art without further explanation.

While I have shown and described the preferred embodiment of the invention and a certain side bearing assembly adapted for use in conjunction or combination therewith, it should be distinctly understood that the disclosure is merely an exemplification of the broad principles involved as the right is reserved to make all such changes and modifications as will not depart from the spirit of the invention or the scope of the claims hereunto appended.

Having thus described the invention, I claim:

1. In combination, a body bolster having a center plate and depending side bearing elements, a truck bolster having load sustaining side bearing means cooperating with said side bearing elements, and guide means for the center plate slidably mounted upon the truck bolster, said guide means including a ring-like body surrounded by a substantially rectangular plate portion and located entirely above the top surface of the truck bolster.

2. In combination, a body bolster having a center plate and depending side bearing elements, a truck bolster having load sustaining side bearing means cooperating with said side bearing elements, and guide means for the center plate slidably mounted upon the truck bolster for movement longitudinally thereof during lateral motion of the body bolster, said guide means including a ring-like body receiving the center plate and surrounded by an outstanding plate portion having marginal ribs.

3. In combination, a body bolster having depending side bearing elements, a truck bolster having side bearing means cooperating with said side bearing elements to sustain the load, and coacting means on the body and truck bolsters slidable with respect to the latter for permitting relative swivelling movement of the bolsters and lateral motion of the body bolster, said means including longitudinal flanges on the top of the truck bolster at the sides thereof, and a ring-like body receiving a center plate carried by the body bolster, the ring-like body being surrounded by an outstanding plate portion having marginal ribs certain of which slidably engage said flanges.

4. In combination, a body bolster having a center plate and depending side bearing elements, a truck bolster having side bearing means cooperating with said depending side bearing elements, means on the truck bolster slidably mounted longitudinally thereof and embracingly engaging said center plate and formed as a ring-like body surrounded by a plate portion having marginal ribs and having diagonal brace webs merging into the ring-like body and into certain of the ribs.

5. In combination, a body bolster having a center plate and depending side bearing elements, a truck bolster having side bearing means cooperating with said depending side bearing elements, means on the truck bolster slidably mounted longitudinally thereof and embracingly engaging said center plate, abutment means for limiting sliding movement of said means, and bracing means on the slidable means at the points of impact with said abutment means.

6. In combination, a body bolster having a center plate thereon, load sustaining side bearing elements depending from the body bolster, a truck bolster, side bearing means on said truck bolster cooperating with said depending side bearing elements, a member slidably mounted on the truck bolster and apertured for the reception of said center plate, guide means on the truck bolster located at opposite sides of said member, means abuttingly engageable by said member for limiting sliding movement thereof, and bracing webs on said slidable member extending radially toward the points of impact.

7. In combination, a body bolster having a center plate thereon, load sustaining side bearing elements depending from the body bolster, a truck bolster, side bearing means on said truck bolster cooperating with said depending side bearing elements, a member slidably mounted on the truck bolster and apertured for the reception of said center plate, guide means on the truck bolster located at opposite sides of said member, and means for limiting sliding movement of said member comprising abutment lugs mounted on the truck bolster at opposite sides of the center thereof.

8. In combination, a body bolster having a center plate and depending side bearing elements, a truck bolster having load sustaining side bearing means cooperating with said side bearing elements, a member slidably mounted on the truck bolster and formed for engagement with said center plate to move with the body bolster, upstanding guide flanges on the truck bolster cooperating with the opposite side edges of said member, and means on the truck bolster engageable by said member for limiting the movement thereof, said flanges being highest at their centers and reduced in height toward their ends, and the sides of said slidable member being thickened.

9. In combination, a body bolster having a center plate and depending side bearing elements, a truck bolster having load sustaining side bearing means cooperating with said side bearing elements, a member slidably mounted on the truck bolster and formed for engagement with said center plate to move with the body bolster, upstanding guide flanges on the truck bolster cooperating with the opposite side edges of said member, means on the truck bolster engageable by said member for limiting the movement thereof, and means connecting said member with the truck bolster to prevent displacement during shipment or handling.

10. In combination, a body bolster having a center plate and depending side bearing elements, a truck bolster having load sustaining side bearing means cooperating with said side bearing elements, a member slidably mounted on the truck bolster and formed for engagement with said center plate to move with the body bolster, upstanding guide flanges on the truck bolster cooperating with the opposite side edges of said member, means on the truck bolster engageable by said member for limiting the movement thereof, and means connecting said member with the truck bolster to prevent displacement during shipment or handling, comprising a securing element passing through said member and through the top of the truck bolster, the top of the truck bolster having an opening accommodating said securing element during movement of said member after installation.

11. In combination, a body bolster having a center plate and depending side bearing elements, a truck bolster having side bearing means for sustaining the load cooperating with said depending side bearing elements and permitting lateral motion of the body bolster, a member mounted for sliding movement upon the truck bolster and formed for conforming reception of said center plate, means for restraining said member against movement transversely of the truck bolster, and means for limiting movement longitudinally of the truck bolster during lateral motion of the body bolster, and means connecting said member with the truck bolster to prevent separation.

12. In combination, a body bolster having a center plate, a truck bolster, load sustaining side bearing means on the truck bolster cooperating with the body bolster, guide means for the center plate slidably mounted upon the truck bolster, and means passing through and connecting said guide means with the truck bolster to prevent displacement during shipment.

13. In combination, a body bolster having a center plate, a truck bolster, load sustaining side bearing means on the truck bolster, the truck bolster having an opening, guide means for the center plate slidably mounted upon the truck bolster, and bolt means carried by said guide means and extending through said opening for connecting said guide means with the truck bolster to prevent displacement during shipment.

14. In combination, a body bolster having a center plate, a truck bolster, load sustaining side bearing means on the truck bolster, the truck bolster having an opening, guide means for the center plate slidably mounted upon the truck bolster, and means carried by said guide means and extending through said opening for connecting said guide means with the truck bolster to prevent displacement during shipment, said means comprising a body member having a laterally extended portion projecting beneath the edge of the opening.

15. In combination, a body bolster having a center plate and depending side bearing elements, a truck bolster having load sustaining side bearing means cooperating with said side bearing elements, and guide means for the center plate slidably mounted upon the truck bolster and formed as a plate with upstanding marginal flanges, a flange embracing the center plate and a series of reinforcing ribs connecting said flanges.

16. In combination, a body bolster having a center plate, a truck bolster, side bearing means on the latter for supporting the former, a guide member for the center plate slidably mounted on the truck bolster, longitudinal flanges at the opposite sides of the truck bolster preventing lateral movement of said guide member, said guide member being provided with flanges projecting outwardly beyond its ends to increase the area bearing against said first named flanges.

In testimony whereof I affix my signature.

THOMAS H. SYMINGTON.